(12) United States Patent
Chen et al.

(10) Patent No.: US 7,682,090 B2
(45) Date of Patent: Mar. 23, 2010

(54) INTEGRATED FOCUSING AND REFLECTING STRUCTURE IN AN OPTICAL ASSEMBLY

(75) Inventors: Qin Chen, Sunnyvale, CA (US); John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/305,455

(22) Filed: Dec. 16, 2005

(65) Prior Publication Data

US 2007/0140625 A1 Jun. 21, 2007

(51) Int. Cl.
*G02B 6/42* (2006.01)
(52) U.S. Cl. .............................. 385/92; 385/88; 385/93
(58) Field of Classification Search ........................ None
See application file for complete search history.

(56) References Cited

U.S. PATENT DOCUMENTS

| | | | |
|---|---|---|---|
| 5,138,677 A * | 8/1992 | O'Shaughnessy et al. ..... | 385/43 |
| 5,838,859 A * | 11/1998 | Butrie et al. .................. | 385/92 |
| 6,793,406 B1 * | 9/2004 | Edwards et al. ................ | 385/88 |
| 6,939,058 B2 * | 9/2005 | Gurevich et al. .............. | 385/93 |
| 6,945,712 B1 * | 9/2005 | Conn ........................... | 385/94 |
| 6,969,204 B2 * | 11/2005 | Kilian .......................... | 385/93 |
| 6,999,644 B1 * | 2/2006 | Lebby et al. ................... | 385/14 |
| 7,192,153 B2 * | 3/2007 | Aoshima et al. ............. | 362/109 |

* cited by examiner

*Primary Examiner*—Tina M Wong
(74) *Attorney, Agent, or Firm*—Workman Nydegger

(57) ABSTRACT

An integrated reflecting and focusing structure for use in optical transmitters and receivers to redirect optical signals when an optoelectronic device of the transmitter or receiver is positioned in an off-center relationship with respect to an intended light path is disclosed. The integrated reflecting and focusing structure simplifies construction while reducing complexity of the device. In one embodiment, an optical subassembly is disclosed and includes a housing and an optical fiber that is coupled to the housing. An optoelectronic component, such as a laser diode, is positioned in the housing and is configured to produce a light beam. The subassembly further includes an integrated focusing and reflecting prism that serves as a means for simultaneously redirecting and focusing the light beam while in transit between the laser diode and the optical fiber. The focusing feature combined with redirection of the light beam obviates the need for a separate lens assembly.

27 Claims, 5 Drawing Sheets

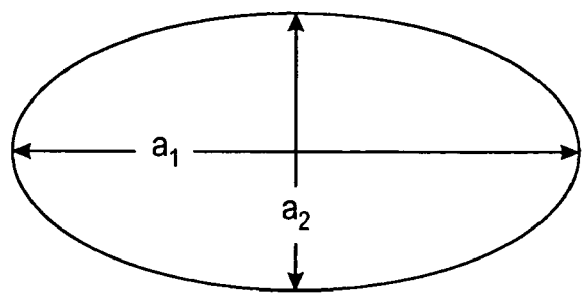 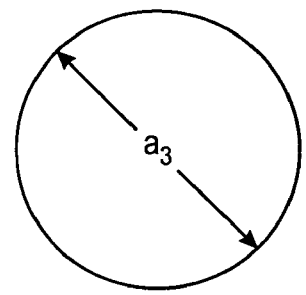
Fig. 4A                    Fig. 4B
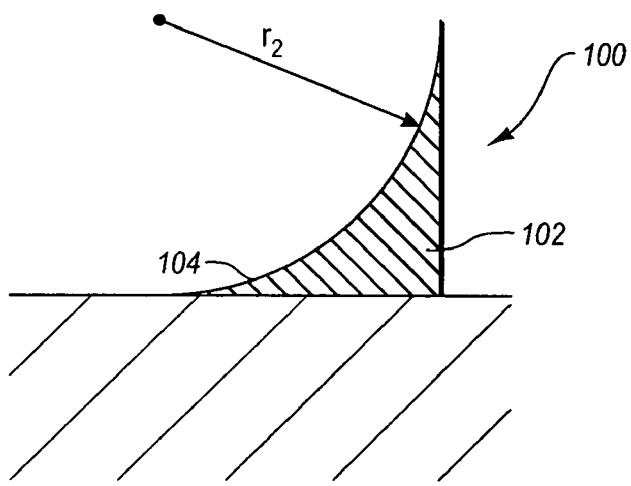
Fig. 5

INTEGRATED FOCUSING AND REFLECTING STRUCTURE IN AN OPTICAL ASSEMBLY

BACKGROUND

1. Technology Field

The present invention generally relates to optical transmitters and receivers. In particular, the present invention relates to an integrated structure for use in optical transmitters and receivers that enables focusing and redirecting of an optical signal to be simply performed.

2. The Related Technology

Optical networking systems, including fiber-optics and optoelectronics, are an important aspect of modem networking circuits for their ability to allow for efficient, accurate, and rapid transmission of data between various components in the network system. As with most communications systems, the efficient use of space in optical networks is of ever-increasing importance. Further, design considerations for such networks must take into account the modularity of the particular components that are included in the network.

Indeed, modular components are desirable in fiber optic systems to reduce the cost of manufacturing the system, which increases the more customized the system becomes. An example of a modular component is an optical transceiver module ("transceiver"). Transceivers usually include an input receiver optical subassembly ("ROSA") and an output transmitter optical subassembly ("TOSA"). The ROSA includes a photodiode for detecting optical signals and sensing circuitry for converting the optical signals to digital electrical signals compatible with other network components. The TOSA includes a light source, such as a laser, for transmitting optical signals and control circuitry for modulating the laser according to an input digital electrical data signal. The TOSA also includes a lens assembly having an optical lens for focusing the light signals from the laser of the TOSA for receipt by an optical fiber. Additionally, the transceiver includes pluggable receptacles for optically connecting the TOSA and the ROSA with other components within a fiber optic network. The transceiver further includes an electronic connector for mating with a host system, such as a computer or communication device, with which the transceiver operates.

As mentioned, a photodiode and laser are employed in the ROSA and TOSA, respectively, and as such are examples of optoelectronic components. Generally, these optoelectronic components are sensitive electrical devices, and therefore require environmental protection. In response to this need, the photodiode and laser are usually positioned in packaging assemblies within the respective ROSA or TOSA. One such packaging assembly is known as a transistor-outline header or transistor-outline package, referred to herein as a "TO package" or "TO can." TO packages are widely used in the field of optoelectronics, and may be employed in a variety of applications. As such, the size of TO packages is often standardized, i.e., modular, to facilitate their incorporation into optoelectronic devices, such as ROSAs and TOSAs. TO packages protect the sensitive components contained therein and electrically connect such devices to external components such as printed circuit boards ("PCBs"), which are also located in the transceiver.

With respect to their construction, TO packages often include a cylindrical metallic base with a number of conductive leads extending therethrough in an arrangement that is generally perpendicular to the base. The size of the base and its respective lead configuration is typically designed to fit within one of a variety of standard form factors, such as TO-5 or TO-46 form factors, for instance. The TO package leads are usually hermetically sealed in the base in such a way as to provide mechanical and environmental protection for the components contained in the TO package, and to electrically isolate the leads from metallic portions of the base. Typically, one of the conductive leads is a ground lead that may be electrically connected directly to the base.

Various types of electrical devices are mounted on an interior surface of the TO package base and connected to the leads. Generally, a cover, or cap, is used to enclose this interior surface where such electrical devices are mounted, thereby forming a chamber with the base that helps prevent contamination or device damage.

The particular design of the TO package depends on both the type of optoelectronic device that is mounted on the base and the configuration of the modular component with which the TO package will operate. By way of example, in applications where the optoelectronic device mounted on the base is an optical device such as a laser or photodiode, the cover of the TO package includes a transparent optical window so to allow an optical signal generated or received by the optical device to be transmitted to or from the TO package. These optical TO packages are also known as window cans.

As mentioned, size is of continuing concern in designing ROSAs, TOSAs, and their respective TO packages. Also, as the rates at which data are transmitted in optically related networks increases, it becomes desirable to reduce the spacing between the various components of the ROSA or TOSA. For example, at data rates of 10 gigabits/second, it becomes highly desirable to position certain high speed or RF electronic components relatively closer to the laser and/or photodetector than in previous designs. In doing so, integrity of the data signal in terms of impedance, electromagnetic interference ("EMI"), and crosstalk is preserved. This repositioning may involve moving components inside of the TOSA or ROSA that were previously located outside thereof. It may also involve moving components that were formerly positioned outside the TO package to within the package itself.

Repositioning components relatively closer to the laser and/or photodiode has presented various challenges, especially when such repositioning involves the inclusion of new components within the TO package itself. Commensurate with these challenges is the fact that transceivers and often TO packages have a predefined size that is set according to industry standards. This has therefore necessitated the rearrangement of components traditionally contained within the TO package in order to accommodate the inclusion of new components.

One example of rearranging existing TO package components involves the laser diode of the TO package contained in the TOSA. Previously, the laser diode could be positioned within the TO package so as to project a light beam directly at and through the window included on the cap portion of the package. The light beam could then be focused by the lens assembly before receipt by an optical fiber optically coupled to the TOSA. After the inclusion of additional components, however, the laser diode must often be positioned horizontally and off-center with respect to the window and beam-receiving optical fiber. As such, the laser diode must project its light beam horizontally with respect to its mounting surface. A suitably positioned 45-degree reflector is then typically positioned to deflect the horizontal light beam upward through the window before focusing of the beam by the lens assembly and subsequent receipt by the optical fiber.

The above off-center laser diode configuration, though often necessary, unfortunately adds to the complexity and cost of the TO package both in terms of the number of parts and the number of parameters that must be adjusted for to accurately align the laser diode, reflector, lens/lens assembly, and optical fiber.

As seen by the above discussion, a need exists for optical transmitter and receiver configurations that avoid the above-described challenges. In particular, a need exists for simplifying light beam direction in packages where the laser diode is positioned in an off-center configuration with respect to an optical fiber or other light-carrying component. Additionally, any solution to the above need should reduce the cost and complexity of the device. Any solution should also have applicability to packages including off-center detectors, such as photodiodes.

BRIEF SUMMARY

The present invention has been developed in response to the above and other needs in the art. Briefly summarized, embodiments of the present invention are directed to an integrated reflecting and focusing structure for use in optical transmitters and receivers to redirect optical signals when an optoelectronic device of the transmitter or receiver is positioned in an off-center relationship with respect to an intended light path. The integrated reflecting and focusing structure simplifies construction while reducing complexity of the device. In one embodiment, an optical subassembly is disclosed and includes a housing and an optical fiber that is coupled to the housing. An optoelectronic component, such as a laser diode, is positioned in the housing and is configured to produce a light beam. The subassembly further includes an integrated focusing and reflecting prism that serves as a means for simultaneously redirecting and focusing the light beam while in transit between the laser diode and the optical fiber. The focusing feature combined with redirection of the light beam obviates the need for a separate lens assembly, thereby simplifying device design.

In another exemplary embodiment, an optical transmitter is disclosed, comprising a light source that is capable of producing a light beam, and an optical fiber capable of receiving the light beam. An integrated focusing and reflecting structure is also included and is configured to directionally redirect and focus the light beam produced by the light source for receipt by the optical fiber. The integrated focusing and reflecting structure can include a coating on an incident surface for beam reflection, or can be monolithically formed of a suitable reflecting material.

In yet another exemplary embodiment, an optical transceiver module is disclosed. The transceiver includes a housing, a transmitter optical subassembly positioned in the housing, and an optical fiber that is coupled to the transmitter optical subassembly. A transistor outline package is included within the transmitter optical subassembly. The transistor outline package includes a mounting surface, and a laser diode that is capable of producing a light beam, wherein the laser diode is positioned on the mounting surface in an off-center relationship with respect to the optical fiber. An integrated focusing and reflecting prism is also included, having a body and an incident surface that is configured to directionally redirect and focus the light beam for receipt by the optical fiber.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A is a cross sectional view of the light beam shown in FIG. 3A, taken along the line 4A-4A;

FIG. 4B is a cross sectional view of the light beam shown in FIG. 3A, taken along the line 4B-4B;

FIG. 5 is a side view of an integrated focusing prism, according to another embodiment.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which is generally directed to an integrated reflecting and focusing structure for use in optical transmitters and receivers to redirect optical signals when an optoelectronic device of the transmitter or receiver is positioned in an off-center relationship with respect to an intended light path. The integrated reflecting and focusing structure simplifies construction of the transmitter or receiver while reducing complexity of the device when alignment of device components is performed.

In the first exemplary embodiment to be described below, an optical transmitter is described is embodied as a transmitter optical subassembly ("TOSA") of an optical transceiver module ("transceiver"). The TOSA, together with a receiver optical subassembly ("ROSA") of the transceiver, includes various components to enable the transmission and reception of optical signals to and from a host system that is operably connected to the transceiver. The host system can be included as a node in an optical communications network, for instance, and can employ the transceiver in communicating via optical signals with other components of the network. Note, however, that the discussion to follow regarding embodiments of the present invention as they relate to an integrated focusing and reflecting structure should not be construed as limiting the present invention to only such embodiments. Indeed, it is appreciated that principles of the present invention can extend to optical transmitters and receivers employed in other configurations as well.

Figure 1:
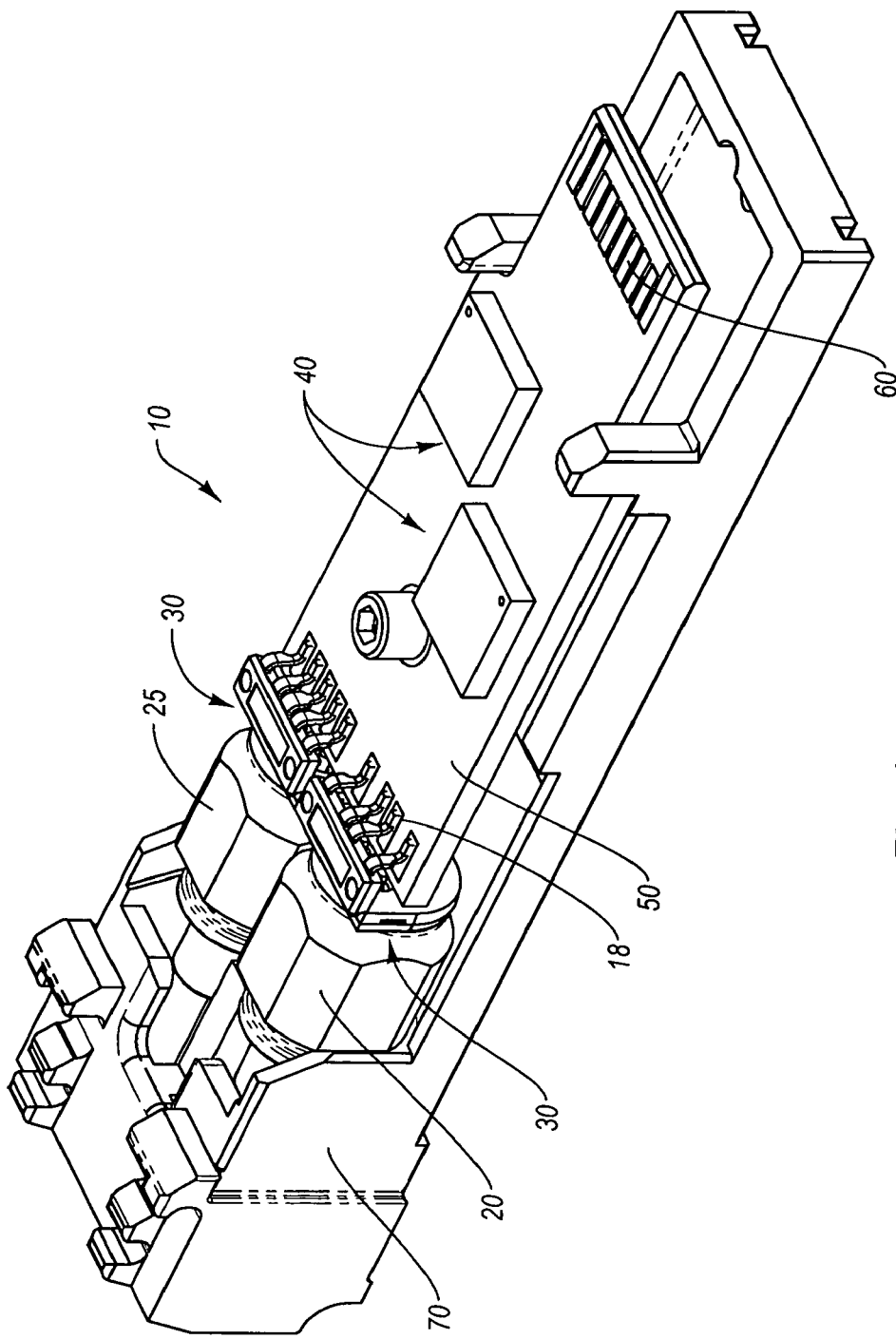
FIG. 1 is a perspective view of an optical transceiver module including an optical transmitter configured according to one embodiment of the present invention.

Reference is first made to FIG. 1, which depicts a perspective view of an optical transceiver module ("transceiver"), generally designated at 10, for use in transmitting and receiving optical signals in connection with an external host that is operatively connected in one embodiment to a communications network (not shown). As depicted, the transceiver 10 shown in FIG. 1 includes various components, including an optical transmitter implemented as a transmitter optical subassembly ("TOSA") 20, a receiver optical subassembly ("ROSA") 25, electrical interfaces 30, various electronic components 40, and a printed circuit board 50. In detail, two electrical interfaces 30 are included in the transceiver 10, one each used to electrically connect the TOSA 20 and the ROSA 25 to a plurality of conductive pads located on the PCB 50. The electronic components 40 are also operably attached to the PCB 50. An edge connector 60 is located on an end of the PCB 50 to enable the transceiver 10 to electrically interface with a host (not shown here). As such, the PCB 50 facilitates electrical communication between the TOSA 20/ROSA 25, and the host.

In addition, the above-mentioned components of the transceiver 10 are partially housed within a housing portion 70. Though not shown, a shell can cooperate with the housing portion 70 to define a covering for the components of the transceiver 100. Note here that the transceiver 10 depicted in FIG. 1 is described by way of illustration only, and not by way of restricting the scope of the invention. As mentioned above, the optical transceiver 10 in one embodiment is suitable for optical signal transmission and reception at a variety of per-second data rates, including 1, 2, 4, 8, 10 Gbit, or higher rates. Furthermore, the principles of the present invention can be implemented in optical transceivers of any form factor such as XFP, SFP, SFF, XPAK, XENPAK, and X2 without restriction.

Figure 2:
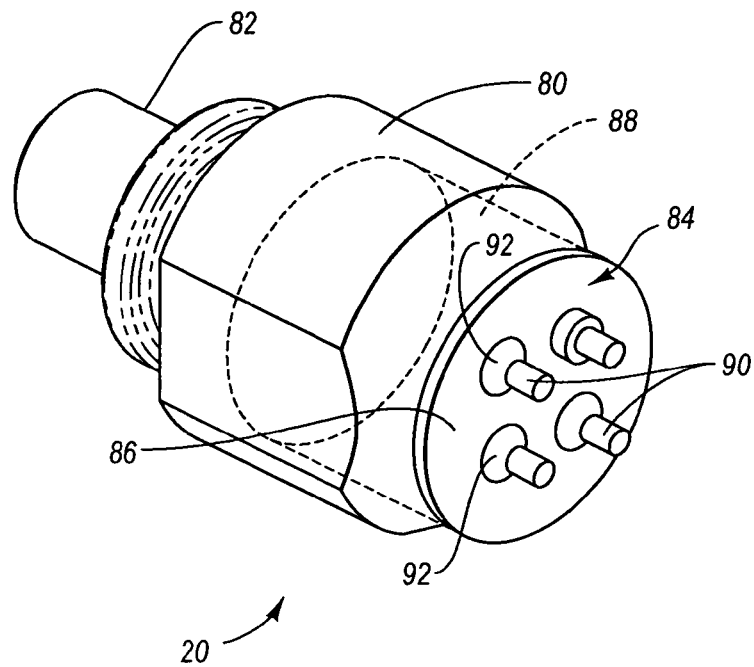
FIG. 2 is a perspective view of a transmitter optical subassembly having an optical transmitter package that is configured according to one embodiment.

Reference is now made to FIG. 2, which depicts various details of the TOSA 20 shown in FIG. 1. As will be seen, the TOSA 20 is one exemplary device that implements an embodiment of the integrated focusing and reflecting structure to be described below. As has already been mentioned, other devices can also utilize embodiments of the present invention, as will be appreciated by those skilled in the art.

In further detail, the TOSA 20 includes a shell 80 that houses various internal components of the TOSA. A nosepiece 82 is attached to or integrally formed with the shell 80 and is configured to optically couple to a connectorized optical fiber (not shown) for enabling optical signals to be transmitted from the TOSA 20.

A transistor-outline ("TO") package 84 is shown mated to the shell 80. The TO package 84 includes a base 86 attached to an end of the TOSA shell 80. A cap, shown in phantom at 88, is positioned within the interior volume defined by the shell 80 and mates with the base 86 to define an enclosure. Within this enclosure are included one or more electronic and optoelectronic components (not shown here) that are mounted to an interior surface of the base 86, called a submount, or to a substrate positioned on the submount. A primary component positioned on the interior surface of the base 86 is a laser diode (not shown here) that acts as an electro-optic transducer for converting an electrical data signal to an optical signal, as will be discussed further below. The components on the submount or substrate are wire bonded or otherwise electrically connected to one or more leads 90, which extend past either surface of the base 86 through holes defined in the base. Seals 92 surround each lead 90 so as to electrically isolate the lead from the base 86. The portions of the leads 90 that extend from the exterior surface of the base 86 are electrically connected to appropriate power or signal lines via an interface, such as the electrical interface 30 shown in FIG. 1. In this way, power and/or data signals are provided to the laser and other components disposed within the TO package 84.

Figure 3A:
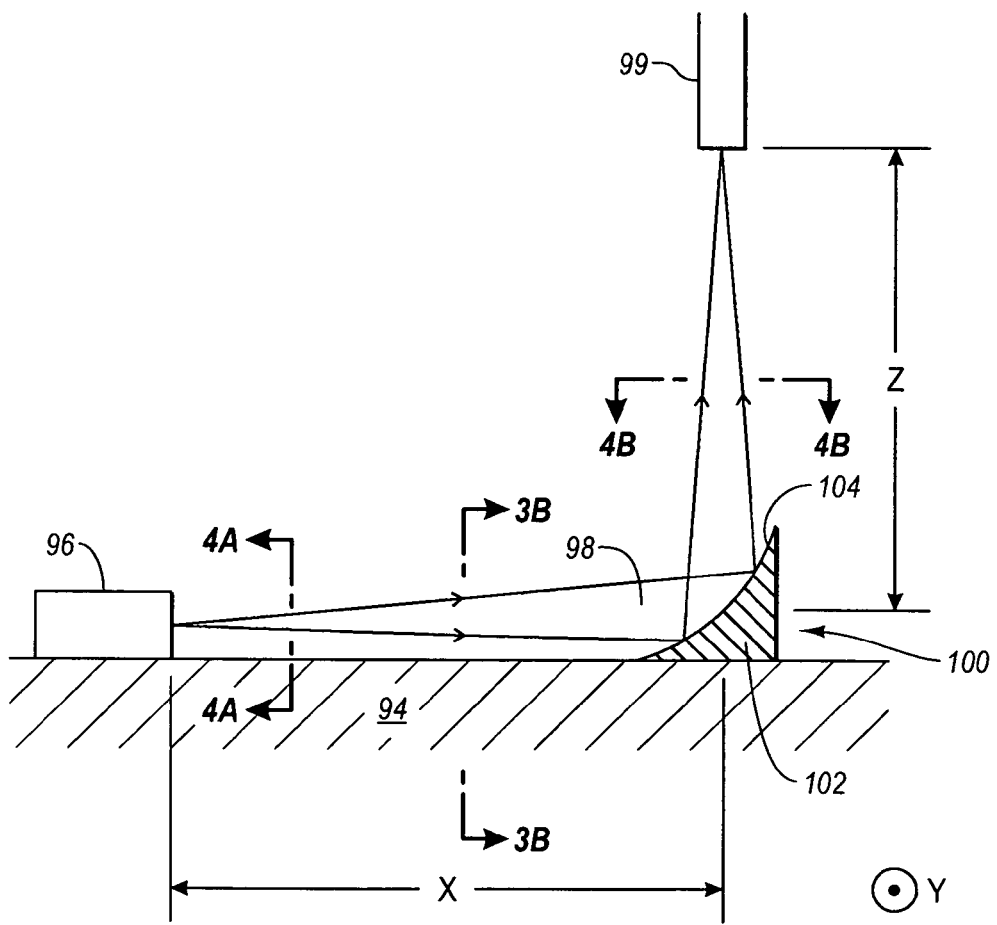
FIG. 3A is a simplified side view of an interior portion of the optical transmitter package shown in FIG. 2.
Figure 3B:
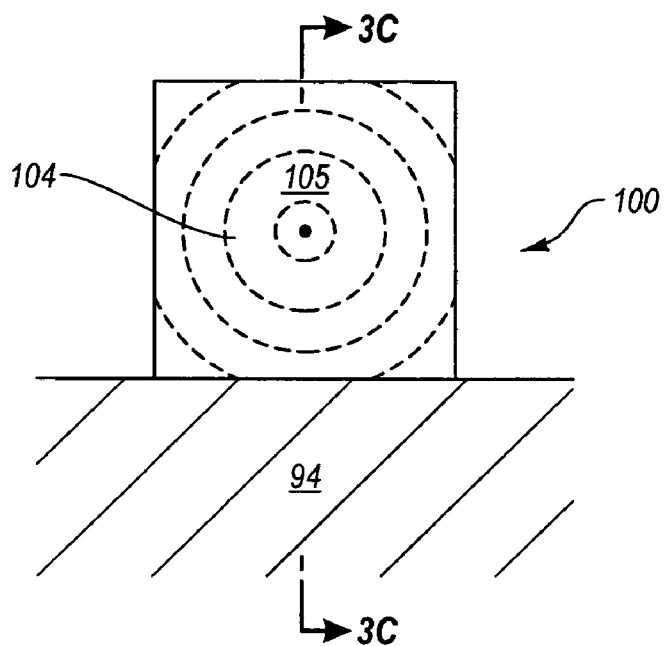
FIG. 3B is another view, taken along the line 3B-3B of FIG. 3A, showing various details regarding an integrated focusing prism, according to one embodiment.
Figure 3C:
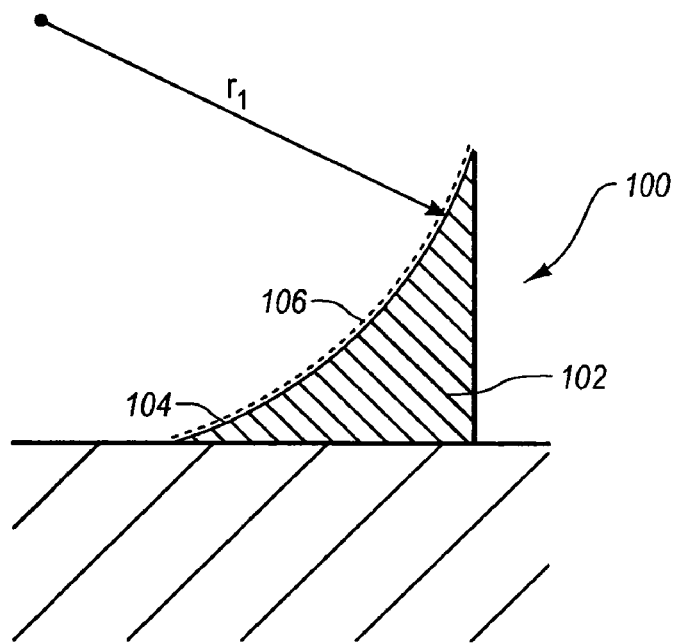
FIG. 3C is a side view of an integrated focusing prism, according to one embodiment.

Reference is now made to FIGS. 3A-3C, which show simplified views of various components that are included in the TOSA 20 and TO package 84 thereof. In detail, FIG. 3A shows a substrate 94 as a mounting surface on which a plurality of components are included. The substrate 94 is mounted on the interior surface of the base 86 of the TOSA TO package 84 shown in FIG. 2, as described above. In another embodiment, the substrate 94 is part of the base 86 itself, and as such forms a submount for the components positioned thereon. In yet other embodiments, it is appreciated that the substrate can represent a surface for component mounting that is part of another device, such as an optical receiver for example.

A light source, such as a laser diode 96, is positioned on the substrate 94 and is capable of producing a light beam 98 having any one or more of a variety of possible frequencies. Examples of devices that can act as the laser diode 96 include DFB and FP laser diodes. These devices produce a light beam from a side surface of the laser diode, as depicted in the orientation shown in FIG. 3A. Other light sources, such as LEDs and VCSELs, can also be acceptably used.

The light beam 98 is modulated during transceiver operation so as to be encoded with data that are to be transmitted via an optical fiber 99 to the optical network or other suitable location. As such, the light beam 98 must be properly oriented and configured to be received by the optical fiber 99. Though not completely depicted here, the optical fiber 99 is optically coupled to a nosepiece, such as the nosepiece 82 of the TOSA 20, thereby enabling it to operate in conjunction with the other components of the TO package 84 shown in FIG. 3A.

As shown in FIG. 3A, and as is common with current TOSA TO package designs, the laser diode 96 is positioned in a non-aligned, or off-center arrangement, with respect to the longitudinal axis of the optical fiber 99 that directs the light beam 98. As has been described, this configuration is often employed so as to enable additional components to be included on the substrate 94 of the TO package. As such, redirection of the light beam 98 after emission from the laser diode 96 is necessary in order to acceptably launch the light beam into the receiving end of the optical fiber 99.

In accordance with one embodiment of the present invention, a means for simultaneously redirecting and focusing an optical signal ("light beam") while in transit between an optical fiber and an optoelectronic component in an optical transmitter is disclosed. According to the present embodiment, this means is implemented as an integrated focusing prism ("prism"), generally designated at 100. Including a body 102 and an incident surface 104, the prism 100 is configured to receive the light beam 98 emitted from the laser diode 96, focus it, and redirect it such that is can be acceptably received by and launched into the optical fiber 99. Further details regarding the prism 100 are given below. Note that the prism 100 is shown in FIGS. 3A, 3C, and similar figures in cross section to better illustrate selected features, as will be described.

As best seen in FIG. 3C, the prism 100 includes the body 102 and the incident surface 104, as was mentioned. The body 102 defines the general shape of the prism 100, and is composed of any suitable material that can be included on the substrate 94 within the environment of the TO package 84. In the present embodiment, the body 102 is composed of plastic and is attached to the substrate 94 via an adhesive or by another suitable manner.

The incident surface 104 is oriented, shape, and otherwise configured to redirect the light beam 98 while at the same time focusing the beam for launching into the optical fiber 99. In the present embodiment, the incident surface 104 generally defines a simple concave shape defined by the radius $r_1$. The concave shape of the incident surface 104 enables focusing of the light beam to occur. It is appreciated that, in other embodiments the shape of the incident surface can vary from what is shown and described herein. For instance, a complex concave shape having two or more distinct curvatures according to sectional axis through the incident surface is possible. Such a complex shape can be useful for correcting the cross sectional shape of the light beam when the beam is not ideally circular, as will be described further below. Generally, the particular shape of the concave surface can be determined using design modeling software, such as that sold under the trademark ZEMAX. In addition, generally non-concave surfaces that serve to redirect and focus the light beam could also be employed. More generally, it is appreciated that a prism or other device that performs redirecting and focusing of the light beam using a different configuration than that shown here, but without the use of an accompanying lens, can also be employed in accordance with principles of the present invention.

In addition, the incident surface 104 is configured to be sufficiently reflective to the incident light beam 98. In the present embodiment, the reflective nature of the incident surface 104 is provided by a coating 106 that is applied as shown in FIGS. 3B and 3C. The coating can be configured to reflect, and therefore redirect, the light beam in different ways. For instance, in one embodiment, the coating 106 can substantially transmit the entirety of the light beam 98 incident thereon. In another embodiment, the coating can be configured to transmit only selected wavelengths, while absorbing others. This may be useful to purify the light beam wavelength that is most desired to be transmitted. Examples of such desired wavelengths include 850, 1310, and 1550 nm. Other similar reflection schemes can be devised in other embodiments to suit the desired light transmission.

In yet another embodiment, the coated incident surface 104 can be configured to reflect only a portion of the light beam, wherein the remainder is absorbed by the prism body 102. This partial reflection may be useful where the laser diode is driven at an increased power level in order to improve its responsiveness while still attenuating (via the prism) the correspondingly increased power level of the light beam to manageable levels.

Note that the incident surface 102 is generally positioned at an angle of 45 degrees with respect to the substrate surface in order to redirect the light beam from the laser diode 96 to the optical fiber 99 through an angle of approximately 90 degrees. It is appreciated, however, that other angles of light beam redirection are also possible, either greater or smaller than 90 degrees, according to the particular configuration of the optical transmitter in which the integrated focusing prism is disposed.

Use of the integrated focusing prism in accordance with present embodiments simplifies assembly and optical alignment of the optical transmitter in which the prism is found, as in the TOSA TO package 84 seen in FIG. 2. In particular, the prism obviates the need for a lens assembly including a lens holder and lens, as this function is performed by the concavity of the prism incident surface. As such, part count for the TO package is reduced by at least two. Fewer parts also equal fewer adjustment parameters during alignment procedures for the light beam. When a standard reflector and lens assembly are employed, five parameters must be considered when aligning the various components for modification of the light beam: laser-to-reflector distance; reflector-to-lens distance; lens curvature; refractive index of lens; and lens-to-optical fiber end distance. Elimination of the lens assembly reduces the number of parameters to just three: laser-to-prism distance; curvature of the incident surface; and prism-to-optical fiber end distance. This simplification in structure and optical alignment represents appreciable cost savings both in terms of parts cost, design costs, and assembly time. Reliability of the device is also enhanced as a result of its structural simplification.

Positioning and placement of the integrated focusing prism can be performed various ways, but in one embodiment, placement of the laser diode 96 and the prism 100 on the substrate 94 is precisely controlled so as to establish a desired spacing, indicated at "x" in FIG. 3A, between the laser diode and the prism. Alignment in the "y" direction, also indicated in FIG. 3A, of the laser diode 96 and prism 100 can be done at this time. The laser diode 96 and prism are then affixed in place on the substrate 94 with the desired spacing "x." Adjustment of the desired spacing, indicated at "z" in FIG. 3A, between the prism 100 and the end of the optical fiber 99 can then occur. This can be achieved in one embodiment by moving the TO package 84 relative to the nosepiece 82, with the optical fiber 99 optically coupled to the nosepiece, before the TO package is affixed to the TOSA shell 80 via epoxy or laser weld. Alignment of the prism 100 and the optical fiber 99 in the "y" direction can also occur at this time. Once proper alignment is achieved, the relative positions of the components can be fixed, if not yet already done. In this way, proper alignment between the various light beam-related components can be achieved, resulting in proper redirection and focusing of the light beam 98, as shown in FIG. 3A. Note that in another embodiment, alignment in the "y" and "z" directions can be achieved by moving the entire TO package relative to the optical fiber 99. Also note that the above alignment can be achieved by machine or manual manipulation. In addition, other alignment schemes that differ from that explicitly described here can also be utilized in other embodiments.

Together with FIGS. 3A-3C, reference is now made to FIGS. 4A and 4B. Embodiments of the integrated focusing prism include the ability for the prism to correct or improve the cross sectional shape of the light beam emitted from the laser diode before reception of the beam by the optical fiber. An example of such ability is shown in FIGS. 4A and 4B, wherein FIG. 4A shows an exemplary light beam cross section 98A taken from a light beam, such as the light beam 98 emitted from the laser diode 96 in FIG. 3C, but before arriving at the prism 100. As shown in FIG. 4A, the light beam 98A has an elliptical cross sectional shape as indicated by major axis "$a_1$" and minor axis "$a_2$." This cross sectional shape for the light beam is not ideal as it lowers the coupling efficiency with the optical fiber. As mentioned, the incident surface 104 of the prism 100 can be shaped and configured to compensate for and correct misshapen light beams. In the present case, the prism incident surface 104 can be configured to modify the light beam such that, upon redirection and reflection by the prism, the light beam appears as that shown at 98B in FIG. 4B, having a radius "$a_3$." So shaped, the light beam 98B can proceed and be launched into the optical fiber 99 with substantially greater coupling efficiency than what would otherwise be possible.

Note that correction of the light beam cross sectional shape using the present integrated focusing prism is achieved in a simpler manner than what would be possible using a corrective lens in a lens assembly, as both the laser diode producing the misshapen light beam and the prism to correct the beam are positioned on a common reference surface, i.e., the substrate 94, as opposed to a lens which can be moved through three axes and therefore creates a complicated maneuvering scenario. Note also that various considerations can be taken into account when determining how to correct for misshapen light beams using the integrated focusing prism, including the numerical aperture of the optical fiber, the initial beam cross sectional shape as produced by the laser diode, inter-component spacing, etc.

FIG. 5 depicts the prism 100 including the body 102 and the incident surface 106. In contrast to previous views, however, the prism incident surface 104 in FIG. 5 has a more pronounced curvature, indicated by radius "r2," than that shown in FIG. 3C. Such a curvature may be desired or necessary in order to work a more pronounced focusing effect on the light beam, for instance. Thus, FIG. 5 serves as yet another example of modifications that can be made to the incident surface of the integrated focusing prism while still residing within the scope of the invention.

FIG. 5 further discloses that the prism 100 is formed monolithically such that the body 102 and the incident surface 104 are composed of the same material. As such, the material from which the body 102 is composed also defines the incident surface 104 and operates as the reflective element for the prism 100. In one embodiment, the prism body 102 is composed of a metal that also defines the incident surface 104 and therefore serves to reflect and redirect the light beam. In this case, no coating is required to be applied to the incident surface 104. Note further that the monolithic material can be configured to exhibit similar characteristics, in terms of partial or complete light beam transmission, light beam purification, etc., to those exhibited by the coating 106 described in connection with FIG. 3C.

Figure 6:
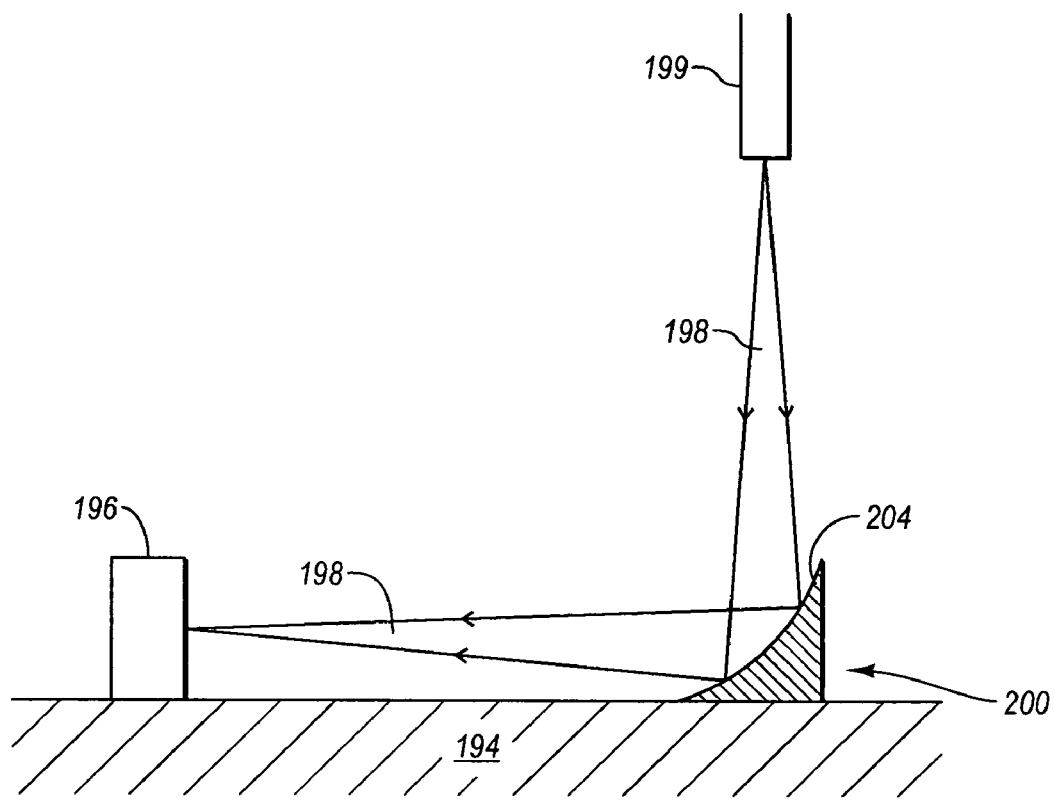
FIG. 6 is a simplified side view of an interior portion of an optical receiver package, including features of another embodiment of the present invention.

Reference is now made to FIG. 6. As was mentioned above, embodiments of the present invention are not limited to use in optical transmitters. FIG. 6 gives one example of this, wherein portions of an optical receiver, such as the ROSA 25 shown in FIG. 1, are shown. The components of FIG. 6 can be included within a TO package of the ROSA 25, similar to the configuration of FIG. 3A for the TOSA 20. In particular, a photodetector, such as a photodiode 196 is included on a substrate 194. A light beam 198 is shown emitted from an end of an optical fiber 199. An integrated focusing prism ("prism") 200 is also shown, positioned and configured to receive, focus, and redirect the light beam 198 received from the optical fiber 199 via its incident surface 204 for receipt by the photodiode 196. Similar to the benefits derived in previous embodiments, use of the prism 200 in an optical receiver obviates the need for a lens and lens assembly, thereby simplifying the structure and assembly of the device while lowering overall device cost.

Note that the prisms 100 and 200 described above serve as examples of a means for simultaneously redirecting and focusing an optical signal in an optical transmitter or optical receiver. It should nonetheless be understood that other structures, devices, or materials can be employed to accomplish the same functionality as described herein. Thus, the figures and discussions contained herein should not be considered as limiting of the present invention to any degree.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical subassembly, comprising:
   a housing;
   an optical fiber at least indirectly coupled to the housing;
   an optoelectronic component positioned in the housing and configured to produce or receive a light beam of a selected wavelength; and
   means for simultaneously redirecting and focusing a portion of the light beam while the light beam is in transit between the optical fiber and the optoelectronic component,
   wherein the means for simultaneously redirecting and focusing is adapted to absorb wavelengths other than the selected wavelength.

2. The optical subassembly as defined in claim 1, wherein the means for simultaneously redirecting and focusing redirects the light beam through an angle of approximately 90 degrees.

3. The optical subassembly as defined in claim 1, wherein the optoelectronic component is a laser diode that produces the light beam.

4. The optical subassembly as defined in claim 3, wherein the laser diode is included in a transmitter optical subassembly.

5. The optical subassembly as defined in claim 3, wherein the means for simultaneously redirecting and focusing causes the light beam produced by the laser diode to be focused at an input end of the optical fiber so as to enable the light beam to be launched into the optical fiber.

6. The optical subassembly as defined in claim 1, wherein the optoelectronic component is a photodiode that receives the light beam.

7. The optical subassembly as defined in claim 6, wherein the photodiode is included in a receiver optical subassembly.

8. The optical subassembly as defined in claim 6, wherein the means for simultaneously redirecting and focusing causes the light beam to be focused on a sensitive region of the photodiode.

9. The optical subassembly as defined in claim 1, wherein the housing is a transistor outline package.

10. The optical subassembly as defined in claim 1, wherein the optical fiber is coupled to a nosepiece of the optical subassembly.

11. The optical subassembly as defined in claim 1, wherein the means for simultaneously redirecting and focusing is a prism having a reflective concave incident surface.

12. The optical subassembly as defined in claim 11, wherein the prism is mounted on a common surface of the optical subassembly with optoelectronic component.

13. An optical transmitter, comprising:
    a light source capable of producing a light beam along a first optical path;
    an integrated focusing and reflecting structure that includes an incident surface, the exterior incident surface being arranged and configured to directionally redirect and focus at least a portion of the light beam along a second optical path; and an optical fiber positioned to receive the redirected light beam via the second optical path, wherein the second optical path is devoid of any intervening lens structure.

14. The optical transmitter as defined in claim 13, wherein the light source is positioned off-center with respect to the optical fiber.

15. The optical transmitter as defined in claim 13, wherein the exterior incident surface includes a reflective coating that at least partially reflects the light beam.

16. The optical transmitter as defined in claim 13, wherein the exterior incident surface comprises a reflective concave surface.

17. The optical transmitter as defined in claim 13, wherein the light source and the integrated focusing and reflecting structure are mounted on a substrate.

18. The optical transmitter as defined in claim 13, wherein the integrated focusing and reflecting structure comprises a monolithic structure that comprises a material that is capable of reflecting the light beam.

19. An optical transceiver module, comprising:
a housing;
a transmitter optical subassembly positioned in the housing;
an optical fiber coupled to the transmitter optical subassembly; and
a transistor outline package included with the transmitter optical subassembly, the transistor outline package including:
a mounting surface;
a laser diode capable of producing a light beam, the laser diode being positioned on the mounting surface in an off-center relationship with respect to the optical fiber; and
an integrated focusing and reflecting prism including a body and an exterior incident surface, the exterior incident surface being configured to directionally redirect and focus the light beam for receipt by the optical fiber along an optical path that is devoid of any intervening lens structure.

20. The optical transceiver module as defined in claim 19, wherein the light beam produced by the laser diode is emitted substantially horizontal to the mounting surface.

21. The optical transceiver module as defined in claim 20, wherein the prism is aligned with at least a portion of the axial length of the optical fiber.

22. The optical transceiver module as defined in claim 21, wherein the exterior incident surface is defined by a first radius.

23. The optical transceiver module as defined in claim 22, wherein the exterior incident surface is defined so as to modify a cross sectional shape of the light beam in a predetermined manner.

24. The optical transceiver module as defined in claim 23, wherein the exterior incident surface is defined with a complex concave shape having at least two distinct curvatures.

25. The optical transmitter as recited in claim 13, wherein the integrated focusing and reflecting structure is optically opaque.

26. The optical transceiver module as recited in claim 19, wherein the integrated focusing and reflecting structure is optically opaque.

27. The optical transceiver module as recited in claim 19, wherein the integrated focusing and reflecting structure comprises metal.

\* \* \* \* \*